United States Patent Office 3,592,863
Patented July 13, 1971

3,592,863
PROCESS FOR THE PREPARATION OF 2,3-DI-METHYL-2,3-BIS-(4-NITRO PHENYL)-BUTANE
Alfons Klein, Duesseldorf, and Karlfried Wedemeyer, Cologne-Stammheim, Germany, assignors to Farbenfabriken Bayer Aktiengesellschaft, Leverkusen, Germany
No Drawing. Filed June 6, 1969, Ser. No. 831,220
Claims priority, application Germany, June 26, 1968, P 17 68 748.8
Int. Cl. C07c 79/10
U.S. Cl. 260—645                                10 Claims

ABSTRACT OF THE DISCLOSURE 2,3-dimethyl-2,3-bis-(4-nitro phenyl)-butane is obtained by heating 4-nitrocumene in a polar organic solvent (e.g. dimethylsulfoxide) in the presence of a basic compound (e.g. sodiumhydroxide) and of an alcohol which is resistant to oxidation (e.g. tert. butanol).

---

This invention relates to a process for the preparation of 2,3-dimethyl-2,3-bis-(4-nitro phenyl)-butane

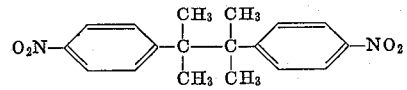

by the oxidising dimerisation of 4-nitrocumene.

The compound obtainable in accordance with the invention has hitherto been far more difficult to obtain than by the process according to the invention. There have never been any processes suitable for producing this compound on a commercial scale.

It is known that 2,3-dimethyl-2,3-bis-(4-nitrophenyl)-butane can be obtained by nitrating 2,3-dimethyl-2,3-diphenyl butane (J. Chem. Soc. (1953), page 160). Unfortunately, 2,3-dimethyl-2,3-diphenyl butane is extremely difficult to obtain. Its preparation involves several reaction stages in each of which the yields are only moderate. In addition, corrosive auxiliaries have to be used (cf. J. Am. Chem. Soc. 61 (1939), page 2142 in conjunction with Coll. Czech. Chem. Comm. 29 (1964) 597–602 and J. Am. Chem. Soc. 82 (1960), page 2931).

Apart from the fact that the starting material for the conventional process is difficult to obtain, the nitration of 2,3-dimethyl-2,3-diphenylbutane involves substantial losses through the formation of isomeric nitro compounds.

A process for the production of 2,3-dimethyl-2,3-bis-(4-nitrophenyl)-butane has now been found in which 4-nitrocumene is heated in a polar solvent in the presence both of a basic compound and of an alcohol which is resistant to oxidation. The 4-nitrocumene is thus dimerised by oxidation.

Some of the 4-nitrocumene used acts as an oxidising agent. The starting material required for the process is readily obtained. There is no need for any auxiliaries that are difficult to handle, 2,3-dimethyl - 2,3 - bis - (4-nitrophenyl)-butane being obtained in highly pure form. Suitable basic compounds include metal hydroxides such as sodium hydroxide and potassium hydroxide, alcoholates such as sodium methylate, potassium methylate, sodium-tert.butylate, potassium-tert.butylate or mixtures of these compounds.

In the context of this invention, aliphatic tertiary alcohols, particularly those containing from 4–12 carbon atoms in the alkyl group, are examples of alcohols that are resistant to oxidation. Tert.-butyl alcohol is preferred. Suitable polar solvents include those which, together with the oxidation-resistant alcohol, adequately dissolve the 4-nitrocumene and the basic compound and which are sufficiently stable in alkaline media. Dimethyl sulphoxide and hexamethylene phosphoric acid triamide represent particularly suitable polar solvents.

The process according to the invention may be carried out by initially dissolving in the oxidation-resistant alcohol from 2 to 20% and preferably from 4 to 12% of its weight of the basic compound, optionally at elevated temperature. The polar solvent may then be added to this solution. The resulting mixture should contain from 10 to 50% by weight, and preferably from 30 to 35% by weight, of the polar solvent.

The 4-nitrocumene may then be added to this mixture at temperatures of from 25 to 80° C., and preferably at temperatures of from 45 to 60° C. The reaction begins immediately, and is recognisable from the precipitation of a brown deposit. The reaction is slightly exothermic and is over after some 20 to 60 minutes.

In general, from 0.5 to 2 litres of a mixture consisting of the basic compound, the oxidation-resistant alcohol and the polar solvent are used per mol of 4-nitrocumene.

The reaction product may be worked up by the usual methods. Preferably, the entire reaction mass is poured into water and made neutral to weakly acid, and the insoluble yellow reaction product is isolated by filtration.

The resulting crude product contains reduction products of 4-nitrocumene as impurities. These impurities may be removed, for example, by extraction with aliphatic hydrocarbons such as petroleum ether or ligroin.

The 2,3-dimethyl-2,3-bis-(4-nitrophenyl)-butane, obtained in accordance with the invention may be used as an intermediate product in the production of plastics (polyurethanes), because the aforementioned nitro-compound can be reduced in the usual manner to the amino-compound, from which, according to well-known processes, the di-isocyanate is formed, which can be reacted with polyfunctional alcohols to said polyurethanes.

EXAMPLE 1

140 g. of KOH are added to 3 litres of tert.-butanol and boiled under reflux for 1 hour with stirring. Following the addition of 20 g. of sodium methylate, the mixture is boiled for another hour. 1.2 litres of dimethyl sulphoxide are then added to the solution, followed by the introduction of 50° C. of 330 g. of 4-nitrocumene. After about 1 minute, a brown deposit is precipitated. The reaction is slightly exothermic. After stirring for 1 hour at 50° C., the solution is poured into 20 litres of ice water. The crude yellow dinitro compound is thus precipitated. After it has been made acid, it is isolated by filtration under suction (310 g. when dry). Extraction with petroleum ether leaves 255 g. of pure 2,3-dimethyl-2,3-bis-(4-nitrophenyl)-butane melting at 260 to 264° C.

EXAMPLE 2

47 g. of potassium-tert.-butylate are dissolved in 470 ml. of tert.-butanol. 120 ml. of dimethylsulphoxide and 33 g. of 4-nitrocumene are added at 50° C., and the mixture is stirred at this temperature for 20 minutes. A brown deposit is precipitated. The reaction product is poured into 2 litres of ice water. After acidification, filtration under suction and drying, 30.5 g. of crude dinitro compound are obtained. Extraction with petroleum ether leaves 25.1 g. of pure 2,3-dimethyl-2,3-bis-(4-nitrophenyl)-butane melting at 261 to 264° C.

EXAMPLE 3

11.8 g. of potassium-tert.-butylate are dissolved in 115 ml. of tert.-butanol. 30 ml. of hexamethyl phosphoric acid triamide and 8.25 g. of 4-nitrocumene are added at 50° C. and the reaction mixture is stirred at this temperature for 1 hour. The reaction product is poured into one-half litre of ice water. After acidification, suction filtration and drying, 6.1 g. of crude dinitro compound are obtained. Extraction with petroleum ether leaves 5.4 g. of pure 2,3-dimethyl-2,3-bis-(4-nitrophenyl)-butane melting at 260 to 263° C.

What is claimed is:

1. A process for the preparation of 2,3-dimethyl-2,3-bis-(4-nitrophenyl)-butane, wherein 4-nitrocumene is heated in a polar solvent in the presence both of a basic compound and of an alcohol which is resistant to oxidation.

2. Process as claimed in claim 1 wherein the reaction temperature is from 25 to 80° C.

3. Process as claimed in claim 2 wherein the reaction temperature is from 45 to 60° C.

4. Process as claimed in claim 1 wherein the alcohol is an aliphatic tertiary alkanol containing from 4 to 12 carbon atoms.

5. Process as claimed in claim 4 in which the alkanol is tert.-butyl alcohol.

6. Process as claimed in claim 1 wherein the basic compound is a metal hydroxide or a metal alcoholate.

7. Process as claimed in claim 6 wherein the basic compound is an alkali metal hydroxide.

8. Process as claimed in claim 1 wherein the polar solvent is dimethylsulfoxide.

9. Process as claimed in claim 1 wherein the polar solvent is hexamethylene phosphoric acid triamide.

10. Process as claimed in claim 1 wherein the basic compound is initially dissolved in the alcohol in an amount of from 2 to 20 weight percent of the alcohol and the polar solvent is then added to form a mixture containing from 10 to 50 percent by weight of polar solvent and the 4-nitrocumene is then added to said mixture.

References Cited

UNITED STATES PATENTS 2,965,681  12/1960  Stansbury et al. _____ 260—645

LELAND A. SEBASTIAN, Primary Examiner

U.S. Cl. X.R.

260—580